United States Patent

Frayer et al.

[11] 3,968,031
[45] July 6, 1976

[54] MULTI-STAGE HYDRODESULFURIZATION PROCESS UTILIZING MULTI-CYCLE SECOND STAGE PROMOTED CATALYST

[75] Inventors: James A. Frayer; Richard E. Hildebrand, both of Indiana; John A. Paraskos, McCandless, all of Pa.

[73] Assignee: Gulf Research & Development Company, Pittsburgh, Pa.

[22] Filed: Apr. 28, 1975

[21] Appl. No.: 572,418

[52] U.S. Cl. .................................................. 208/210
[51] Int. Cl.² ............................................. C10G 23/02
[58] Field of Search .............. 208/210, 213, 216, 89

[56] References Cited
UNITED STATES PATENTS

| | | | |
|---|---|---|---|
| 3,546,105 | 12/1970 | Jaffe | 208/216 |
| 3,791,967 | 2/1974 | Jaffe | 208/216 |
| 3,840,473 | 10/1974 | Beuther et al. | 208/216 |
| 3,859,202 | 1/1975 | Brunn et al. | 208/210 |

*Primary Examiner*—G. J. Crasanakis

[57] ABSTRACT

An asphaltene-containing oil hydrodesulfurization process employing stages in series with an interstage flashing step. The second stage catalyst comprises supported Group VI and Group VIII metals together with a promoting amount of Group IV-B metal. The first stage catalyst comprises supported Group VI and Group VIII metals without promotion with Group IV-B metal. In the process, deactivated first stage catalyst is replaced at least once without replacing the promoted second stage catalyst so that the promoted second stage catalyst is onstream for at least two first stage catalyst cycles.

5 Claims, 6 Drawing Figures

FIRST STAGE AGING
PROMOTED VERSUS NON-PROMOTED CATALYST

FIG. 1

TWO STAGE VERSUS ONE STAGE DESULFURIZATION WITH NON-PROMOTED CATALYST

MULTI-STAGE HYDRODESULFURIZATION PROCESS UTILIZING MULTI-CYCLE SECOND STAGE PROMOTED CATALYST

This invention relates to a process for the hydrodesulfurization of metal- and sulfur-containing asphaltenic heavy oils employing non-promoted and promoted hydrodesulfurization catalysts in series.

The present process employs as a first series catalyst a supported Group VI and Group VIII metal hydrodesulfurization catalyst. Suitable Group VI and Group VIII metal combinations include cobalt-molybdenum, nickel-tungsten and nickel-molybdenum. A preferred combination is nickel-cobalt-molybdenum. The catalyst can comprise 5 to 30 weight percent, generally, and 8 to 20 weight percent, preferably, of Group VI and VIII metals. The remainder of the catalyst generally comprises a highly porous, non-cracking supporting material. Alumina is the preferred supporting material but other porous non-cracking supports can be employed, such as silica-alumina and silica-magnesia. Most of the sulfur and metals in the feed oil are removed by the first series catalyst.

The second series catalyst of this process employs a catalyst composition which generally is described by the definition of the first series catalyst, except that the second series catalyst is promoted with one to ten weight percent, generally, and 2.5 to 8 weight percent, preferably, of a Group IV-B metal, such as titanium, zirconium or halfnium, preferably titanium, in addition to the other components as described in the definition. The first series catalyst differs in general from the second series catalyst in that the first series catalyst does not contain a promoting amount of Group IV-B metal. In the second series catalyst the Group IV-B metal and the Group VI and VIII metals are impregnated on the surface of the support, as disclosed in U.S. Pat. No. 3,840,473, which is hereby incorporated by reference, as contrasted to being incorporated within the supporting material. A solution of titanium tetrachloride in n-heptane can typically be employed for the impregnation. Use of more than 8 to 10 weight percent of Group IV-B metal could be deleterious to hydrodesulfurization activity, as well as being economically wasteful. A molecular monolayer coverage of titanium oxide on commonly employed hydrodesulfurization catalyst supports would deposit about 5 to 8 weight percent of titanium on the catalyst. Use of more than a monolayer would be wasteful and could tend to block catalyst pores and prevent access of large oil molecules to the catalyst interior. On the other hand, less than one weight percent of titanium will not promote the activity of a catalyst.

The preparation of the first series catalyst does not include a step for impregnation of Group IV-B metal on the supporting material, so that the first stage catalyst can be substantially free of Group IV-B metal.

Preferably, all or a large proportion of both the non-promoted and the promoted catalyst particles have a diameter between 0.025 and 0.05 inch (0.0635 to 0.127 cm).

In the present process, the feed oil initially flows downwardly through a fixed bed of the non-promoted catalyst. The non-promoted catalyst removes 60, 70, 80 or more weight percent of the feed metals and sulfur from the oil. The oil is then passed downwardly through a fixed bed of the promoted catalyst. Very little hydrocracking occurs in the combination process. Most of the product oil boils above the IBP of the feed oil, generally, and preferably at least 70, 80 or 90 percent of the total product boils above the IBP of the feed oil to the first stage.

The hydrodesulfurization process of this invention employs a hydrogen partial pressure of 1,000 to 5,000 pounds per square inch gauge (70 to 350 kg/cm$^2$), generally, 1,000 to 3,000 pounds per square inch (70 to 210 kg/cm$^2$), preferably, and 1,500 to 2,500 pounds per square inch (105 to 175 kg/cm$^2$), most preferably.

The gas circulation rate can be between 1,000 and 20,000 standard cubic feet per barrel (17.8 and 356 SCM/100L), generally, or preferably about 2,000 to 10,000 standard cubic feet per barrel (35.6 to 178 SCM/100L). The gas circulated preferably contains 85 percent or more of hydrogen. The mol ratio of hydrogen to oil can be between about 4:1 and 80:1. Reactor temperatures can vary between about 600° and 900°F. (316° and 482°C.), generally, and between 650° and 800°F. (343° and 427°C.), preferably. Reactor temperatures are increased during a catalyst cycle to compensate for activity aging loss. The temperature should be sufficiently low so that not more tha 30 percent, generally, and preferably not more than about 10, 15 or 20 percent of the 650°F.+ (343°C.+) feed oil will be cracked to material boiling below 650°F. (343°C.). The liquid hourly space velocity in each reactor can be between about 0.1 and 10, generally, and between about 0.2 and 1 or 1.25, preferably.

The feed to the first stage of the process of this invention can be a full petroleum crude or a reduced crude containing substantially all of the residual asphaltenes of the full crude. The process is also useful for desulfurizing other asphaltene-containing oils, such as coal liquids and oils extracted from shale and tar sands. Asphaltenes have a relatively low hydrogen to carbon ratio and will generally comprise less than about 10 percent of the feed oil, but will generally contain most of the metallic components present in the total feed, such as nickel and vanadium. Since conventional desulfurization catalysts have a high activity for demetallization as well as for desulfurization, the non-promoted first stage catalyst removes most of the nickel and vanadium from the charge stock as well as most of the sulfur. These metals deposit heavily on the outermost regions of the catalyst cross-section and tend to inhibit access to catalyst pores and thereby reduce the desulfurization activity of the catalyst. Removed nickel and vanadium generally account for the ultimate deactivaton of first stage desulfurization catalysts, while coke deposition during removal of sulfur and nitrogen contributes very little to catalyst deactivation in the first stage.

Petroleum atmospheric or vacuum tower residua contain substantially the entire asphaltene fraction of the crude from which they are derived and therefore contain 95 to 99 weight percent or more of the nickel and vanadium content of the full crude. The nickel, vanadium and sulfur content of petroleum residua can vary over a wide range. For example, nickel and vanadium can comprise 0.002 to 0.03 weight percent (20 to 300 parts per million) or more of the residua, while sulfur can comprise about 2 to 7 weight percent, or more of the oil.

In the initial or non-promoted catalyst stage of the present process, nickel and vanadium removal from the feed oil can be as rapid as sulfur removal. However, removal and subsequent deposition of nickel and vanadium upon the catalyst results in a greater degree of catalyst deactivation than does sulfur and nitrogen removal because the removed metals deposit upon the catalyst whereas sulfur and nitrogen removed from the charge escapes as gaseous hydrogen sulfide and ammonia. In the first stage, the nickel and vanadium gradually accumulate on the surface of the catalyst, ultimately causing the catalyst pores to become blocked. Upon blockage of the pores the aging rate of the catalyst ceases to be gradual and the catalyst aging rate increases abruptly to terminate the catalyst cycle.

The Group VI and Group VIII metals which are conventionally employed on hydrodesulfurization catalysts primarily impart desulfurization activity to the catalyst. Group IV-B promoter metals of the second series catalyst of this invention improve the desulfurization activity of Group VI and Group VIII catalytic metals, but Group IV-B metals are relatively expensive and incur a cost increase for the catalyst. Although the promoted catalyst will provide increased desulfurization activity in a first hydrodesulfurization stage, and therefore can be advantageously employed in first stage operation, we have discovered that the increased desulfurization activity of the promoted catalyst when employed in a first hydrodesulfurization stage is much less than the improvement in desulfurization activity which is imparted by the promoted catalyst in a second stage. Furthermore, we have found that this relatively smaller advantage of the promoted catalyst over the non-promoted catalyst in a first hydrodesulfurization stage declines with progressive catalyst age, while the relatively larger desulfurization activity advantage of the promoted catalyst over the non-promoted catalyst in the second stage steadily increases with progressive catalyst age. A further disadvantage to the use of the promoted catalyst in a first stage is that the life of any first stage catalyst is ultimately limited by relatively rapid and irreversible metals deactivation and regardless of the desulfurization activity of the first stage catalyst, the total weight of sulfur that can be removed with any first stage catalyst is limited by metals deposition on the catalyst. This factor tends to render it less economic for processing most higher metals residua to incur the additional cost of the promoted catalyst in first stage operation.

In accordance with this invention, at least one bed of the non-promoted catalyst is disposed upstream from at least one bed of the promoted catalyst. The beds can be disposed in a single reactor, or in separate reactors. When disposed in separate reactors, a particular advantage is obtained by disposing a gas flashing step between a first non-promoted catalyst stage and a second promoted catalyst stage.

In the latter context, a first stage denotes one or more reactors which precede in interstage flashing step, while a second stage denotes one or more reactors which follow the interstage flashing step. Most of the metals and sulfur are removed from a feed oil in at least one first stage. The oil is then passed to at least one second stage for removal of the more refractory sulfur. In the second stage, the primary cause of catalyst deactivation is coking. Desulfurization severity is greater in the second stage than in the first stage, and it is known that catalyst coking increases with desulfurization severity. Catalyst coking occurs so extensively in a second hydrodesulfurization stage that the second stage aging rate is considerably more rapid than the first stage aging rate. In prior art two-stage residual oil hydrodesulfurization processes employing non-promoted catalysts with an interstage flash for removal of contaminant by-product gases, such as hydrogen sulfide, ammonia and gaseous hydrocarbons, and with progressively increasing temperatures in each stage to compensate for catalyst aging, it is commonly known that both the catalyst aging rate and coke formation on the catalyst is considerably greater in the second stage than in the first stage. This high second stage coking phenomenon can probably be explained on a molecular basis. In the first stage, the existence of peripheral alkyl groups on feed asphaltene and resin molecules provides steric hindrance which tends to prevent contact of the polycondensed ring inner body of the residual molecules with the catalyst. However, the most refractory sulfur in the asphaltene molecules is not removed in the first stage and must be removed in a second stage. This sulfur is more refractory because it tends to be deeply imbedded in the aromatic nucleus. Following the eliminaton of some of the alkyl groups in the first stage, the molecules entering the second stage are sterically better adapted to permit the aromatic nucleus to abut broadly against catalyst sites exposing the hydrogen and carbon atoms and ultimately the imbedded sulfur more intimately to the catalyst surface, thereby inducing coking. This mechanism probably accounts for the enhanced catalyst coking and higher aging rates in the second stage, as compared to the first stage.

We have discovered that in a second desulfurization stage the promoted catalyst exhibits a high desulfurization activity with a greatly inhibited coke make. This probably accounts for the observed relative improvement of the promoted catalyst in the second stage with increasing catalyst age. In addition to the observed improved desulfurization activity and the improved second stage aging rate, we have also found that a given degree of desulfurizaton can be achieved with a substantially lower consumption of hydrogen with the promoted catalyst in the second stage, as compared to the use of a non-promoted catalyst in the second stage. This hydrogen savings accords with data showing that the promoted catalyst in the second stage is considerably more selective towards the desulfurization reaction than the non-promoted catalyst so that the promoted catalyst induces considerably less side reactions, such as hydrogenolysis, aromatics saturation, metals removal, etc.

The selectivity of the promoted catalyst in the second stage for the desulfurization reaction is so great that it has been found that if sufficient volume of promoted catalyst is disposed in the second stage to provide a double second stage cycle corresponding to each first stage catalyst cycle, only a nominal penalty in hydrogen consumption is incurred. For example, in one instance where the hydrogen consumption with sufficient promoted catalyst in a second stage for a six month cycle was 200 SCF per barrel (3.56 SCM/100L), it was found that the hydrogen consumption only increased 15 SCF per barrel (0.267 SCM/100L) when sufficient catalyst was disposed in the second stage reactor to last for a twelve month cycle. In contrast, when employing a non-promoted catalyst in the same second stage operation, the hydrogen consumption for a six month cycle was 300 SCF per barrel (5.34 SCM/100L), and when sufficient non-promoted catalyst was present in the reactor for a twelve month cycle the hydrogen consumption increased to 350 SCF per barrel (6.23

SCM/100L). Therefore, the hydrogen penalty for the double second stage cycle was only 15 SCF per barrel (0.267 SCM/100L) with the promoted catalyst, but was 50 SCF per barrel (0.890 SCM/100L) with the non-promoted catalyst. These data show that while the promoted catalyst in the second stage provides a high single cycle savings in hydrogen consumption, the relative savings in hydrogen consumption is mgnified when a multiple cycle second stage catalyst fill is employed. The economic advantage of employing a multiple cycle catalyst fill in the second stage is that the second stage reactor does not have to be emptied and refilled at each such occurrence for the first stage, thereby saving on process turnaround costs.

Since the promoted and the non-promoted catalysts are both subject to a metals-limited catalyst life-cycle in a first stage desulfurization, and since the relative desulfurization advantage of the promoted catalyst in first stage operation is relatively small and decreases with catalyst age, the promoted catalyst is not employed in a first hydrodesulfurization stage of this invention. Instead, the less costly non-promoted catalyst is employed in the first stage. Since the second stage catalyst life cycle is coke-limited and since the particular advantage of the promoted catalyst is its high resistance against coking, in accordance with this invention the promoted catalyst is employed in a second stage, or downstream in a first stage, preceded by a bed of non-promoted catalyst. In either case, the feed oil is first passed over a sufficient quantity of non-promoted hydrodesulfurization catalyst to accomplish removal of most of its sulfur and metals content, and is then passed in series over the promoted catalyst, wherein a smaller amount of sulfur is removed, which sulfur is considerably more refractory. Thereby, the cheaper non-promoted catalyst is utilized in a relatively early stage in which metals deactivation is controlling, while the more expensive promoted catalyst is utilized in a later stage in which coke deactivation is controlling, since the promoted catalyst is capable of inhibiting coking to a much greater extent than the non-promoted catalyst.

A further advantage can be achieved from the promoted catalyst in the second stage because it is relatively protected from the cycle-limiting effect of metals deactivation. We have discovered that the promoted catalyst undergoes rapid autoregeneration in a second stage operation by in situ removal of surface coke upon an increase in hydrogen pressure. If the promoted catalyst is onstream in a second stage for a period of time at a first hydrogen partial pressure, followed by a period of operation at a relatively higher hydrogen partial pressure, and then is returned to operation at the first hydrogen pressure, we have found that the catalyst exhibits a higher activity upon its return to the lower hydrogen pressure. The higher activity is evidenced by a reduced temperature requirement for a given degree of desulfurization, upon return of the catalyst to the initial hydrogen pressure. The promoted catalyst catalyzes addition of hydrogen to surface coke with elevation of hydrogen pressure so as to solubilize a portion of the surface coke and thereby partially regenerate the catalyst. We have found that the promoted catalyst exhibits an improved kinetic effect for catalyst coke reduction using the method of increased hydrogen pressure, as compared to a non-promoted catalyst. Tests demonstrate that the time requirement to improve the activity of a second stage non-promoted catalyst by an elevation in hydrogen pressure is considerably longer than is required by the promoted catalyst. Therefore, the promoted catalyst can provide an advantage in second stage operation not only by initially inhibiting coke formation but also by catalyzing coke removal from the catalyst via hydrogenation to solubilize the coke and mobilize it into a flowing process oil stream. In order to reactivate the second stage catalyst, the hydrogen partial pressure should be increased at least 50 psi, generally, and at last 150 psi, preferably, and the second stage should be operated at the higher pressure for at least 24 hours.

Since total pressure in any reactor employing the promoted catalyst is established by reactor metallurgical limitations, the hydrogen pressure cannot be arbitrarily increased in a commercial operation in order to reduce the coke level on the catalyst. However, the catalytic de-coking effect can be made operational commercially by intermittently increasing hydrogen purity in the promoted catalyst reactor to increase hydrogen partial pressure, without increasing the total reactor pressure. Thereby, the process can be operated for a period of time required for catalyst rejuvenation by utilizing a hydrogen feed stream having an elevated hydrogen partial pressure at a constant total pressure. After the coke level is reduced, process operation can be returned to the lower hydrogen partial pressure with the promoted catalyst in a more active condition. This operation can be repeated a number of times to extend the total life of the promoted catalyst.

A practical method for accomplishing an intermittent increase in hydrogen partial pressure is to reduce the oil feed rate to the reaction system. In multi-stage commercial hydrodesulfurization systems, make-up hydrogen is generally charged to a second series reactor rather than to a first series reactor since the second reactor experiences the greater coking problem. At a constant ratio of hydrogen feed to oil feed, a reduction in oil feed rate will result in a reduction in recycle hydrogen gas requirements at a fixed gas to oil ratio. Since a portion of the recycle hydrogen gas is passed to the second reactor, any reduction in recycle hydrogen presents an opportunity for increasing the make-up hydrogen rate to the second reactor without increasing total pressure. Since recycle gas comprises 90 percent hydrogen, or less, and the make-up stream comprises at least 95 percent hydrogen, this procedure can intermittently increase hydrogen pressure in the second stage to accomplish a reduction in coke level while the hydrodesulfurization process is continuing.

It is noted that it is not generally possible to successfully regenerate conventional hydrodesulfurization catalysts by combustion methods. Such catalysts contain at least some vanadium deposited by the feed oil and it is believed that during combustion in the presence of sulfur vanadium sulfates are formed which coat and permanently deactivate the catalyst.

The following tests illustrate the advantages of the promoted catalyst in a second stage of the hydrodesulfurization process of the present invention. In all of the tests, unless otherwise indicated the feed oil to the first desulfurization stage is a 50 percent reduced Kuwait petroleum residue containing 3.9 weight percent sulfur. The promoted catalyst in all tests comprised alumina which was triply impregnated with molybdenum, nickel and titanium, in that order, containing three percent nickel, eight percent molybdenum and five percent titanium, the rest being alumina. The non-promoted catalyst in all tests contained 0.6 percent nickel, 1.1 percent cobalt, 8.7 percent molybdenum, the remainder being alumina.

Figure 1:
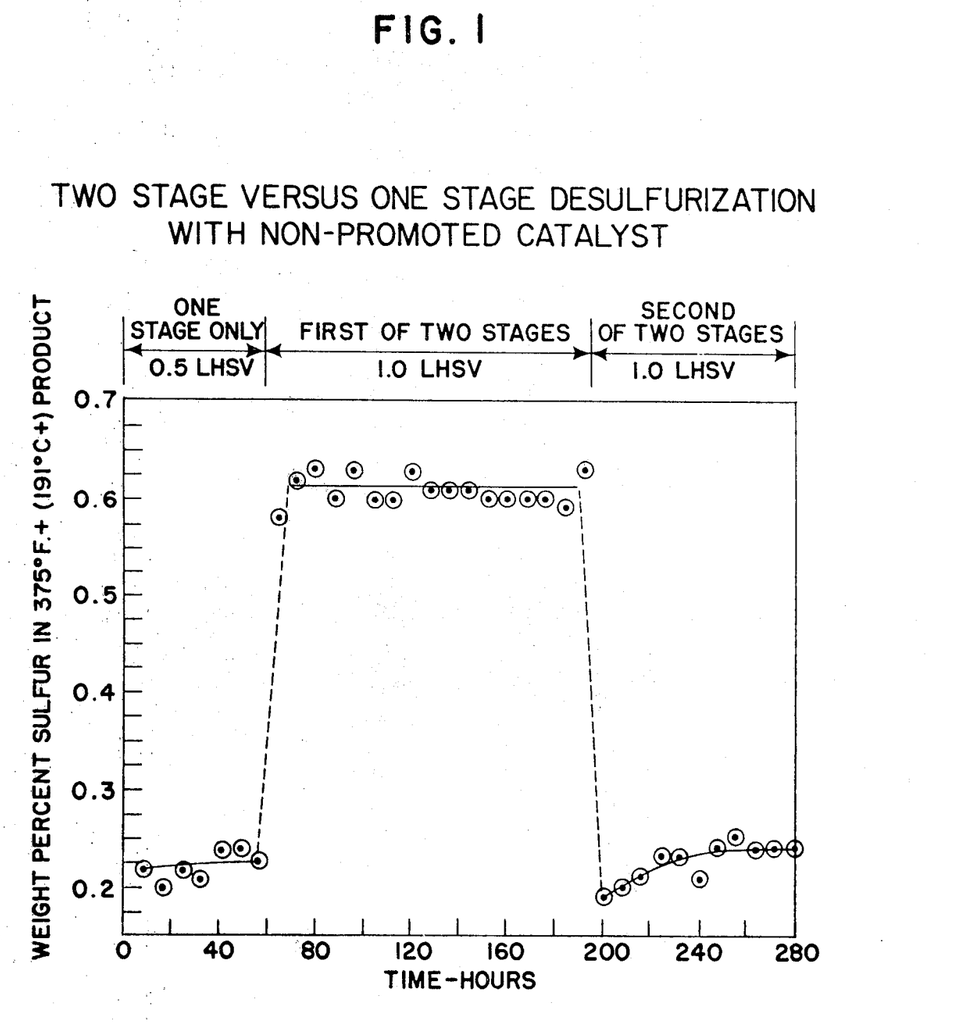
Figure 2:
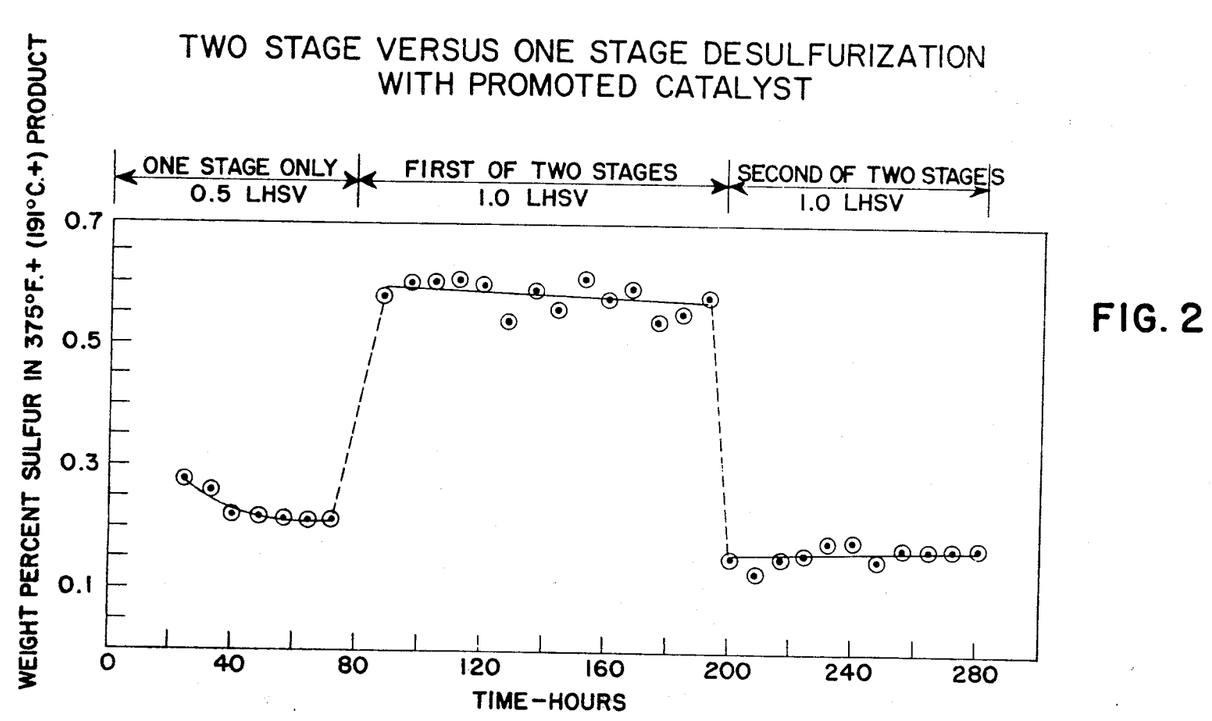

FIGS. 1 and 2

FIG. 1 is explained in detail in Example 1 and FIG. 2 is explained in detail in EXAMPLE 2. By way of introduction to Examples 1 and 2, it is noted that FIG. 1 shows the results of simulated two-stage hydrodesulfurization employing an unpromoted hydrodesulfurization catalyst in both stages, while FIG. 2 shows the results of a simulated two-stage hydrodesulfurization employing a promoted catalyst in both stages. Each simulated two-stage desulfurization is compared in the same figure to a single stage desulfurization performed with the same catalyst under the same conditions to the two-stage desulfurization severity. These figures show that in all first and second stage tests the promoted catalyst provides a product having a lower sulfur level than the non-promoted catalyst. These figures also show that a decided advantage occurs due to two-stage operation as compared to single stage operation when employing either a promoted or an unpromoted catalyst, but the advantage in the simulated two-stage operation is quickly lost due to rapid catalyst deactivation in the second stage with the non-promoted catalyst (indicating rapid coking); while the advantage of the simulated two-stage operation is retained for an extended period of operation under second stage conditions when the promoted catalyst is employed (indicating improved retardation of coking).

The following examples illustrate the advantages of the promoted catalyst in two-stage operation. Exceptional conditions were employed in these examples to accentuate the advantages obtainable in two-stage operation with the promoted catalyst. For example, relatively high hydrogen partial pressures were employed in order to diminish the general advantage of two-stage operation over single stage operation. Generally, high hydrogen pressures are so favorable to the reaction that use of two-stages is not required. In addition, the first stage liquid product after removal of accompanying gaseous material was depressurized to atmospheric pressure in order to permit dissolved hydrogen sulfide and ammonia to escape from the feed oil being charged to the second stage. Thus, the positive influence of small quantities of these materials upon moderation and maintenance of second stage catalyst activity was virtually eliminated in order to further diminish the advantage of second stage operation and thereby demonstrate more clearly the inherent advantages of the promoted catalyst over the unpromoted catalyst.

EXAMPLE 1

The tests shown in FIG. 1 were all performed with a non-promoted catalyst at 2,850 psi (199.5 kg/cm$^2$) hydrogen pressure and a temperature of 777°F. (414°C.). The tests shown in FIG. 2 were all performed with a promoted catalyst under milder conditions including a milder hydrogen pressure of 2,780 psi (194.6 kg/cm$^2$) and a milder temperature of 750°F. (399°C.).

In the initial aging plateau shown in FIG. 1, a 0.225 percent sulfur product was produced in one stage with the non-promoted catalyst at a LHSV of 0.5. The space velocity was then raised to 1.0 to provide the second aging plateau, whereat the sulfur content of the product leveled out at 0.61 percent. The liquid product from this 1.0 LHSV run was separated from gaseous products, depressurized, and together with fresh hydrogen was used as liquid feed for the next run over the same catalyst, also at 1.0 LHSV. The two series passes at 1.0 LHSV resulted in an overall LHSV of 0.5 for the two 1.0 LHSV passes. The initial sulfur content for the second stage effluent was 0.19 percent, which is lower than the 0.225 percent single stage sulfur level at 0.5 LHSV and which indicates that a desulfurization advantage is achieved by employing two-stage rather than single stage desulfurization in conjunction with an interstage flash. An advantage in two-stage operation would be expected because the interstage flashing step removes hydrogen sulfide and ammonia which are reaction products and because there is an elevated second stage hydrogen pressure resulting from the removal of gaseous impurities. However, FIG. 1 shows that very rapid second stage catalyst deactivation occurred when employing the non-promoted catalyst in the second stage so that the second stage product sulfur level rapidly increased and leveled out at 0.24 percent, which is higher than the sulfur level obtained in the earlier single pass run at 0.5 LHSV. FIG. 1 therefore shows that the second stage aging phenomenon rapidly cancels the advantage of two-stage operation, whereby after about only 24 hours of second stage operation there is no net benefit for two-stage operation. Therefore, FIG. 1 shows that the non-promoted catalyst failed to demonstrate the aging stability in second stage operation that it demonstrated in single stage operation as indicated in the one stage test of FIG. 1.

Evidently, the initially observed advantage in the second stage shown in FIG. 1 is due to the higher hydrogen partial pressure in the second stage due to interstage flashing of contaminant gases. However, the rapid onset of aging in the second stage is probably due to the fact that the ammonia and hydrogen sulfide removed in the interstage flash step are required to stabilize the non-promoted catalyst against coking in the second stage. Hydrogen sulfide and ammonia are not adequately produced in the second stage since most of the sulfur and nitrogen in the feed oil is removed from the feed oil in the first stage. It is believed that ammonia is required to partially moderate catalyst acidity, while hydrogen sulfide is required to maintain control of the active presulfided state of the catalyst. The reason that the single stage test of FIG. 1 showed catalyst stability at the same desulfurization severity as the two-stage test apparently is that the single stage operation occurred entirely in the presence of the total make of ammonia and hydrogen sulfide in the system, while the second stage operation occurred in the presence of only the relatively small make of ammonia and hydrogen sulfide occurring in the second stage.

Table 1 shows detailed data from the tests illustrated in FIG. 1.

TABLE 1

FIGURE 1 DATA - NON-PROMOTED CATALYST
2,830 psi (198 kg/cm²) and 777°F. (414°C.)

| | Feed | One Stage Only | First of Two Stages | Second of Two Stages |
|---|---|---|---|---|
| LHSV | — | 0.5 | 1.0 | 0.5 |
| Sulfur, Wt. % | 3.89 | .31 | .60 | .25 |
| Nitrogen, Wt. % | .22 | .11 | .14 | .11 |
| Carbon, Wt. % | — | 87.06 | — | 87.34 |
| Hydrogen, Wt. % | — | 12.52 | — | 12.45 |
| Nickel, ppm | 15 | .1 | 1.8 | .2 |
| Vanadium, ppm | 54 | <.1 | 1.6 | <.1 |
| API | 15.4 | 25.3 | 23.4 | 24.8 |
| Distillation, Vol. % Condensed at °F. | | | | |
| 5 | 633(333°C.) | 499(259°C.) | 548(287°C.) | 508(264°C.) |
| 10 | 750(399°C.) | 563(295°C.) | 611(322°C.) | 574(301°C.) |
| 30 | 844(451°C.) | 724(384°C.) | 763(406°C.) | 734(390°C.) |
| 50 | 967(519°C.) | 834(446°C.) | 878(470°C.) | 848(453°C.) |
| 80 | — | 1,048(565°C.) | — | 1,055(568°C.) |
| Cracked at | 1,024(551°C.) | 1,067(575°C.) | 1,062(572°C.) | 1,055(568°C.) |
| % over | 69 | 84 | 77 | 80 |
| Carbon Residue: Rams, D524 | 9.04 | 2.21 | 3.61 | 2.52 |

EXAMPLE 2

FIG. 2 shows the results of similar tests, except that a promoted catalyst is employed. FIG. 2 shows that when the promoted catalyst is employed in two stages in series together with an interstage flash, as contrasted to a single stage, there is a substantial process improvement and catalyst savings, and that the second stage catalyst deactivation rate is so low with the promoted catalyst that this improvement is still in effect and is being retained after 80 hours of second stage catalyst aging. The results of FIG. 2 are in contrast to the results of FIG. 1 which showed the improvement due to two-stage operation was lost after only 24 hours with the non-promoted catalyst, due to catalyst aging.

All the tests of FIG. 2 were performed with a promoted catalyst under milder conditions than the tests of FIG. 1 including a hydrogen pressure of 2,780 psi (194.6 kg/cm²) and at a temperature of 750°F. (399°C.).

The first aging plateau of FIG. 2 shows the results of a single stage operation with the promoted catalyst in which a product containing 0.21 percent sulfur product was produced. Next, the space velocity was increased to 1.0, resulting in a liquid product containing 0.58 percent sulfur. Depressurized liquid product was accumulated from the 1.0 LHSV operation after being separated from gaseous products and the depressurized liquid together with fresh hydrogen was used as feed for a second pass over the same catalyst during the last 80 hours of the test. The space velocity for the second pass over the catalyst was also 1.0, giving an overall space velocity of 0.5 for the two 1.0 LHSV passes, since the first section liquid yield was 99.5 to 100 volume percent. The second section product averaged 0.17 percent sulfur, which is 0.04 percent less sulfur than was contained in the product produced during the single section portion of the test at 0.5 space velocity, thereby providing an advantage in two-stage operation with the promoted catalyst. However, unlike the aging characteristics in the second stage with the non-promoted catalyst wherein the advantage in two-stage operation was retained for only 24 hours because of rapid second stage catalyst deactivation, FIG. 2 shows that with the promoted catalyst after 80 hours of second stage operation the advantage of the two-stage operation was still in effect and being maintained. Therefore, the promoted catalyst exhibits the capacity of retaining its activity and its resistance against coking in the absence of the ammonia and hydrogen sulfide from the first stage which was removed in the interstage flash, even though relatively little additional ammonia and hydrogen sulfide is produced in the second stage. In the tests, the interstage removal of first stage ammonia and hydrogen sulfide was accentuated by depressurizing the interstage liquid, whereby even dissolved ammonia and hydrogen sulfide was permitted to escape from the oil. Therefore, the promoted catalyst is free from dependence upon first stage hydrogen sulfide and ammonia, allowing an extended activity advantage in second stage operation as a result of the enhanced hydrogen partial pressure resulting from the interstage flash. In this manner, the promoted catalyst provides improved second stage operation in the face of prolonged aging even though most of the hydrogen sulfide and ammonia is produced in the first stage and does not enter the second stage, and even though relatively little hydrogen sulfide and ammonia is produced in the second stage.

Aside from these considerations regarding the promoted catalyst under the effects of two-stage operation, a comparison of FIGS. 1 and 2 show that the promoted catalyst was also more active than the non-promoted catalyst in single stage operation. Even though the promoted catalyst was tested at a temperature which is 27°F. (15°C.) lower than that of the non-promoted catalyst, at 0.5 LHSV in single stage operation it produced 0.21 percent product sulfur v. 0.225 percent for the non-promoted catalyst; and at a 1.0 LHSV in a single stage it produced 0.58 percent product sulfur v. 0.61 percent for the non-promoted catalyst. Therefore, the above demonstrated advantage for the promoted catalyst regarding its second stage aging superiority compounds the activity advantage of the promoted catalyst inherent in single stage operation.

The decrease in product sulfur level due to two-stage operation indicates that appreciable activity has been gained by the use of a two section process so that, if desired, the amount of catalyst can be decreased considerably when a two section process is used with the promoted catalyst instead of a one section process producing a given sulfur content product.

EXAMPLE 3

An extended catalyst aging test was conducted to more completely demonstrate the relative aging advantage of a promoted catalyst in the second stage of a residual oil hydrodesulfurization process. In this test the promoted catalyst reduced the sulfur content of a first stage hydrodesulfurization effluent from 1 to 0.3 weight percent sulfur, following an interstage flash. The aging run for the promoted catalyst was made at 1.0 LHSV and 1,830 psi (128 kg/cm²) hydrogen partial pressure. This aging test is illustrated by the lower curve in FIG. 3.

Figure 3:
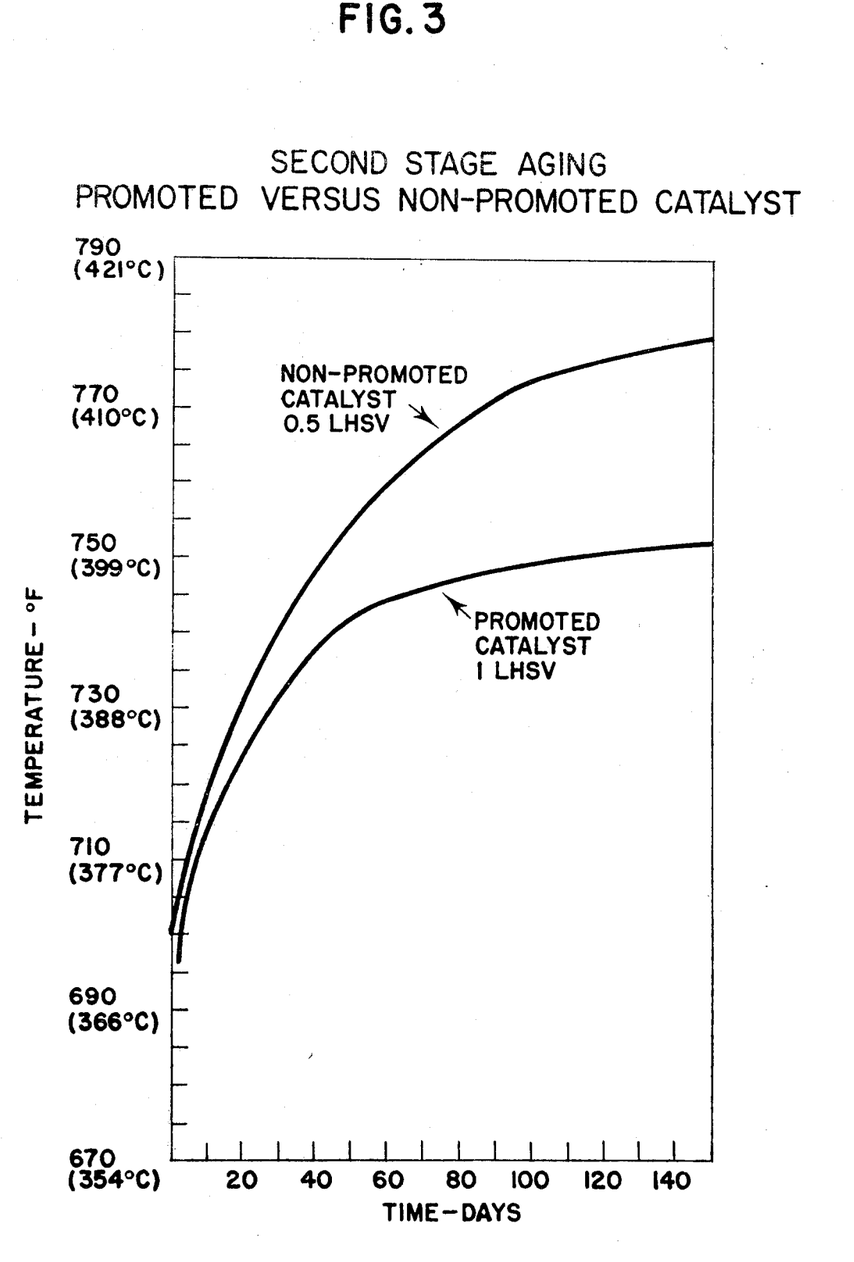

For comparison purposes, the upper curve of FIG. 3 presents the second stage aging curve for a non-promoted catalyst second stage operation in which flashed first stage desulfurization effluent was also reduced in sulfur content from 1 to 0.3 weight percent, but at the milder space velocity of 0.5. A comparison of the aging curves of FIG. 3 show that the promoted catalyst in the second stage exhibits a considerably lower deactivation rate with age as compared to the non-promoted catalyst, even though the promoted catalyst is handicapped by a space velocity which is double the space velocity for the non-promoted catalyst. FIG. 3 shows that the promoted catalyst after 150 days of second stage operation at a space velocity of 1.0 required a temperature of only 754°F. (401°C.), while the non-promoted catalyst after 150 days of second stage operation to achieve the same level of desulfurization at a milder space velocity of only 0.5 required a temperature of 780°F. (416°C.). FIG. 3 therefore demonstrates that in the second stage the promoted catalyst is considerably more than twice as active in an extended aging process as compared to the non-promoted catalyst and that in the second stage the relative activity advantage of the promoted catalyst over the non-promoted catalyst progressively increases with catalyst age.

EXAMPLE 4

Figure 4:
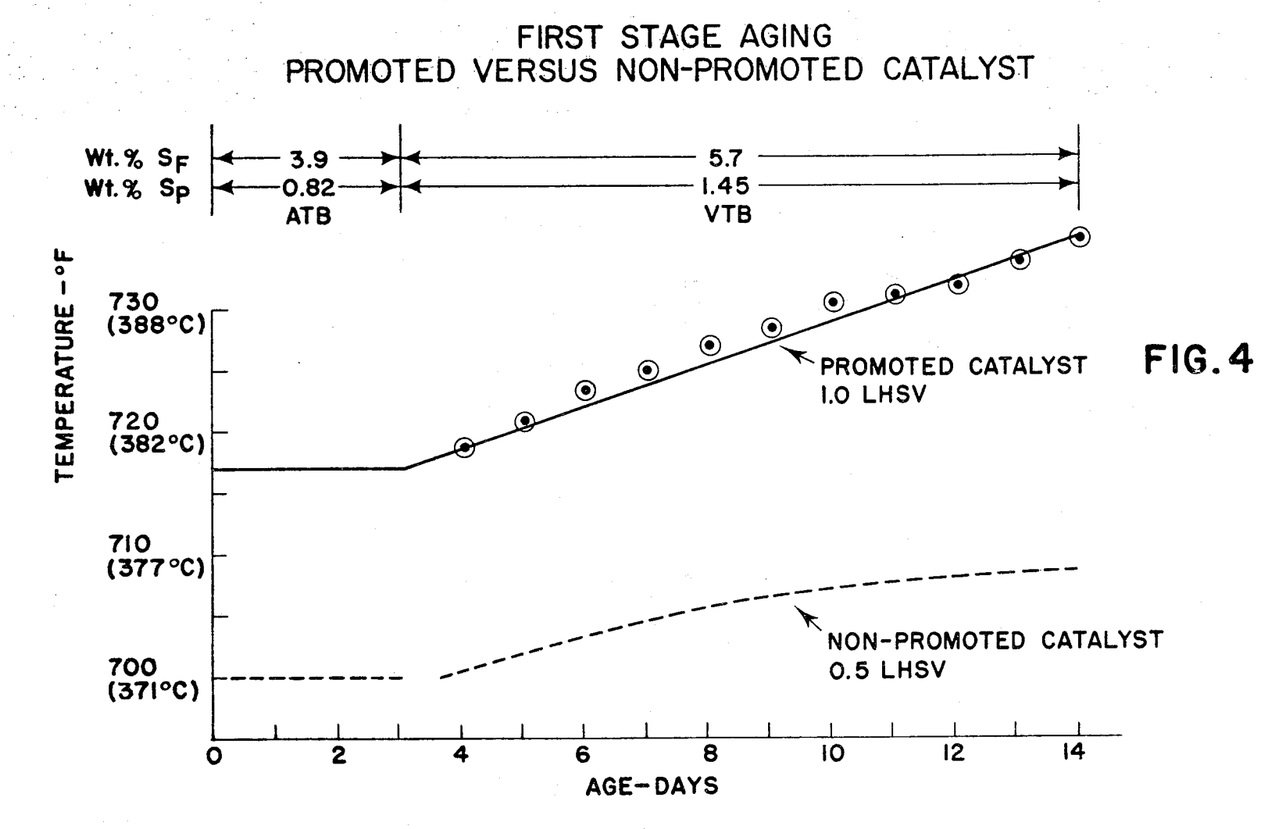

FIG. 4 contains the results of tests which show that the remarkable hydrodesulfurization aging superiority of the promoted catalyst in second stage operation which is shown in FIG. 3 does not prevail in first stage operation. Although a comparison of FIGS. 1 and 2 show that the promoted catalyst is superior in hydrodesulfurization activity to the non-promoted catalyst in first stage operation, a comparison of FIG. 4 with FIG. 3 shows that the advantage in utilizing the promoted catalyst in first stage operation is much lower than in second stage operation.

FIG. 4 compares the promoted and non-promoted catalysts in first stage operation utilizing the same space velocity handicap for the promoted catalyst as was employed in the second stage data of FIG. 3, i.e. the promoted catalyst was tested in a fist stage at a LHSV of 1.0, while the non-promoted catalyst was operated under the same conditions in a first stage except at a LHSV of only 0.5. The tests of FIG. 4 were made at a hydrogen pressure of 2,275 psi (159 kg/cm²). As shown in FIG. 4, in an initial test, Kuwait atmospheric tower bottoms (ATB) containing 3.9 weight percent sulfur was passed through each single stage to reduce its sulfur content to 0.82 weight percent. FIG. 4 shows that the promoted catalyst required a temperature about 17°F. (9.5°C.) higher than the non-promoted catalyst. Subsequently, a Kuwait vacuum tower bottoms (VTB) containing 5.7 weight percent sulfur was passed over each catalyst to reduce its sulfur content to 1.45 percent. In these tests, the temperature elevation requirement for the promoted catalyst as compared to the non-promoted catalyst gradually increased from 17° to 32°F. (9.5° to 17.9°C.) with increasing catalyst age.

FIGS. 3 and 4 therefore show both first stage tests and second stage tests wherein the promoted catalyst is compared with the non-promoted catalyst with a uniform relative space velocity handicap placed upon the tests utilizing the promoted catalyst. FIG. 3 shows that in spite of the space velocity handicap, in the second stage the promoted catalyst exhibits a temperature advantage over the non-promoted catalyst and the temperature advantage increases with catalyst age. FIG. 4 shows that with the same space velocity handicap in the first stage, the promoted catalyst exhibits a temperature disadvantage as compared to the non-promoted catalyst, and the temperature disadvantage either remains steady or increases with catalyst age. Therefore, in a process with an extended catalyst life, the promoted catalyst may not provide an economic advantage in first stage operation due to the higher relative cost of the promoted catalyst, while in second stage operation the economic advantage of the promoted catalyst increases with extended catalyst age. Therefore, the present invention applies to processes wherein there is an extended oil throughput based on the catalyst. As shown in FIG. 3, the relative advantage of the promoted catalyst is significantly magnified after 20 or 30 days of age, which corresponds to a oil throughput over the second stage catalyst at 1 LHSV of 1.9 or 2.85 barrels of oil per pound of catalyst (137.3 to 206 L/kg).

EXAMPLE 5

Calculations were made based on test results to show the advantage achieved in single stage operation utilizing a non-promoted catalyst when a portion of the non-promoted catalyst at the downstream end of a first stage reactor is replaced by promoted catalyst. The calculation assumes that a Kuwait ATB having 3.9 weight percent sulfur is converted to a product having 0.3 percent sulfur in a single stage at a temperature of 700°F. (371°C.) and a hydrogen pressure of 2,275 psi (159 kg/cm²). In a base calculation employing non-promoted catalyst throughout the reactor, the LHSV in a top section of the reactor is 1.0 and the LHSV in a contiguous bottom section of the reactor is 0.3. In a comparison calculation, non-promoted catalyst is still employed in the same top section of the reactor at a LHSV of 1.0, but the non-promoted catalyst in the bottom section of the reactor is replaced by a smaller amount of promoted catalyst to provide a bottom section space velocity of 0.73. The smaller amount of promoted catalyst in the second section constitutes the amount of promoted catalyst required to continue to produce the effluent sulfur product containing 0.3 percent sulfur. Use of the smaller amount of promoted catalyst constitutes a 58.9 percent savings in catalyst in the bottom section, and a hydrogen savings of 146 SCF per barrel (2.63 SCM/100L), or a 41 percent hydrogen savings in the bottom section. Based on the total reactor, use of the promoted catalyst in the bottom section provides a 45.3 percent catalyst savings and an 18 percent hydrogen savings.

EXAMPLE 6

Table 2 lists the end of run operating conditions and the first order reaction rate constants for both a non-promoted and a promoted catalyst for a second stage operation in which the oil sulfur level in a first stage desulfurization effluent is reduced from 1 to 0.3 weight percent. At about 85 percent desulfurization of Kuwait ATB, apparent hydrodesulfurization reaction kinetics change from second order to first order. Consequently, the data in Table 2 are described by first order kinetics. The first order reaction rate constant, corrected to a temperature of 750°F. (399°C.), is a direct measure of catalyst activity. The reaction rate constants are calculated using the weight hourly space velocities and show that in the second stage the promoted catalyst is 33 percent more active than the non-promoted catalyst at the same barrel per pound age.

TABLE 2

SECOND STAGE DESULFURIZATION

| | Non-Promoted Catalyst | Promoted Catalyst |
|---|---|---|
| Age (bbl/lb) | 2.45 (664 l/kg) | 2.44 (664 l/kg) |
| Hydrogen Pressure, psi | 1,830 (128 kg/cm²) | 1,830 (128 kg/cm²) |
| Average Reactor Temp. °F. | 746 (397°C.) | 747 (398°C.) |
| Desulfurization, Percent | 66.7 | 66.7 |
| Hydrogen Consumption (SCF/B) | 220 (3.92 SCM/100L) | 200 (3.56 SCM/100L) |
| LHSV (hr⁻¹) | 0.60* | 0.88 |
| WHSV (hr⁻¹) | 0.77 | 1.04 |
| First Order Reaction Rate Constant at 750°F. (399°C.) $K = \ln \frac{S_{in}}{S_{out}}$ WHSV | 0.91 | 1.21 |

*Space velocity at barrels per pound age and temperature listed. Most of this run was made at a lower LHSV of 0.35.

Table 2 also shows that the promoted catalyst achieved the same degree of desulfurization as the non-promoted catalyst with a considerably reduced consumption of hydrogen. Therefore, the promoted catalyst is more selective to the desulfurization reaction than the non-promoted catalyst, and the savings in hydrogen shown in Table 2 for the promoted catalyst is an indication that hydrogen-consuming side reactions, such as hydrogenolysis, aromatics saturation, metals removal, etc., do not occur to as great an extent with the promoted catalyst as with the non-promoted catalyst.

Table 2 shows that the promoted catalyst achieves the same product sulfur level as the non-promoted catalyst even though it operated at a considerably higher space velocity. Therefore, at a uniform space velocity for the two catalysts, the promoted catalyst could achieve a desired sulfur level at a lower temperature than the non-promoted catalyst in the second stage, since at a given hydrogen pressure, space velocity and temperature are interchangeable parameters.

In summation, Table 2 shows that as compared to a non-promoted catalyst in the second stage, the promoted catalyst achieves a given level of desulfurization with a lower hydrogen consumption and at a higher space velocity and/or lower temperature.

EXAMPLE 7

Figure 5:
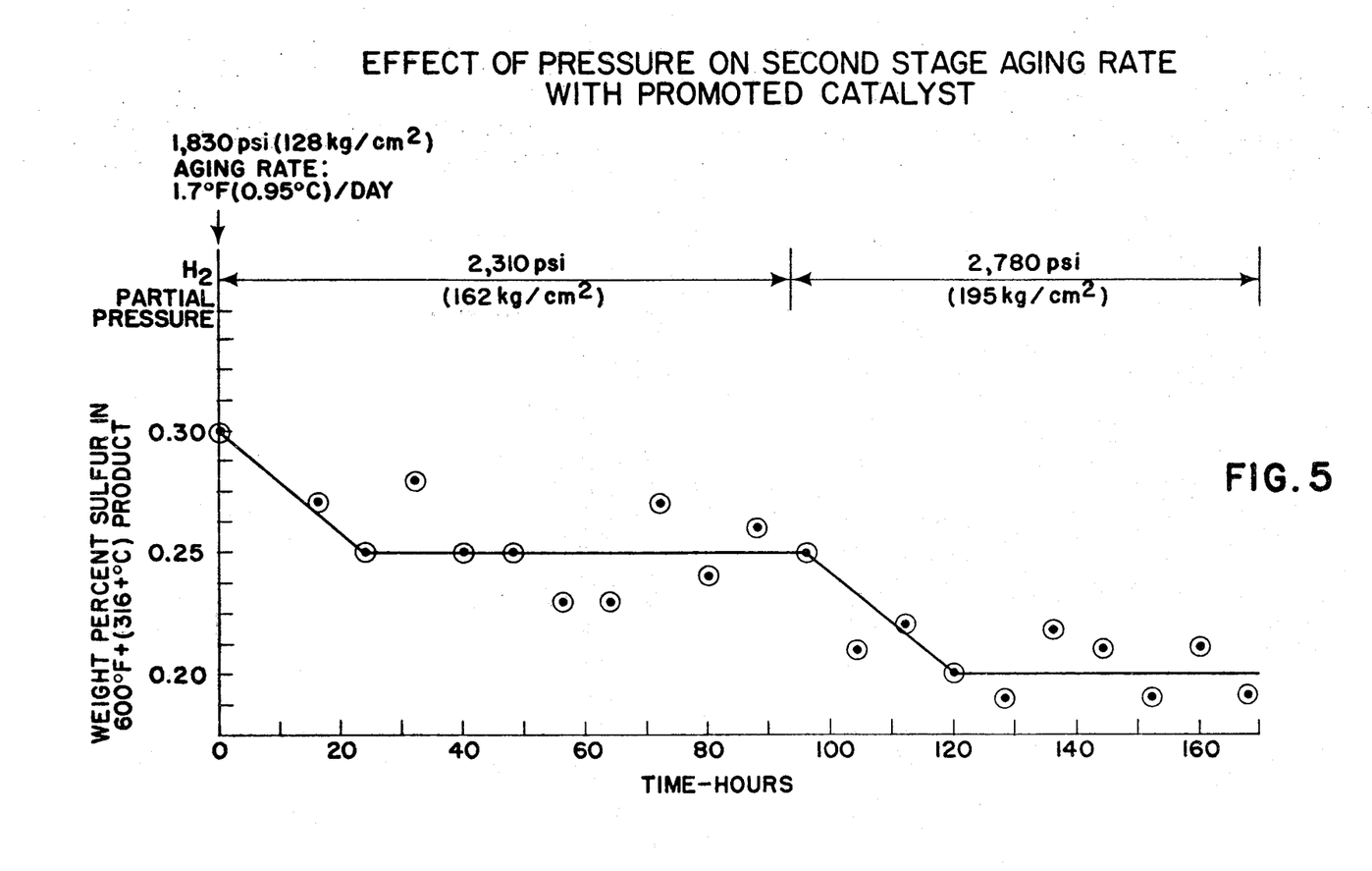

Tests were performed to show the effect of changes in hydrogen partial pressure upon the aging rate of the promoted catalyst in second stage operation. The results of these tests are illustrated in FIG. 5. The tests of FIG. 5 were performed at a constant LHSV of 0.88. The zero age point of FIG. 5 represents a promoted catalyst which has been in continuous operation at 1,830 psi (128 kg/cm²) producing 0.3 weight percent sulfur product with the catalyst aging at a rate of 1.7°F. (0.95°C.) per day. Upon raising the hydrogen pressure to 2,310 psi (162 kg/cm²), after only a 24 hour coke equilibration period a product containing 0.25 percent sulfur product was produced with no catalyst aging. Upon further raising of the pressure to 2,780 psi (195 kg/cm²), after only another 24 hour coke equilibration period the product sulfur decreased to 0.20 percent with no catalyst aging. As shown in FIG. 5, after each increase in hydrogen pressure it took only 24 hours for the catalyst to become equilibrated to a stable more active state, indicating the attainment of a new and lower equilibrium coke level on the catalyst. While the increased desulfurization level is significant, a more important effect of the increased pressure was the substantial elimination of catalyst aging, as compared to the 1.7°F. (0.95°C.) per day initial aging rate. After these periods of operation at the elevated pressures, the system as returned to the original 1,830 psi (128 kg/cm²) hydrogen pressure with the same space velocity and temperature that had produced a 0.3 weight percent product, and it was found that for about one day the product sulfur level was only 0.25–0.26 percent. This shows that the employment of the elevated hydrogen pressures induced an increase in desulfurization activity upon return to the initial relatively lower hydrogen pressure conditions.

For comparison purposes, tests were made with a non-promoted catalyst in a second stage at 777°F. (414°C.) and a LHSV of 0.5. Initially, the non-promoted catalyst converted an oil containing 1 percent sulfur at a hydrogen pressure of 1,860 psi (130 kg/cm²) to a product having 0.3 percent sulfur. Thereupon, the hydrogen pressure was increased to 2,375 psi (166 kg/cm²) and a seven day transition period was required for the product sulfur level to line out at 0.21 percent. After 13 days of operation at 2,375 psi (166 kg/cm²), the hydrogen pressure was increased to 2,500 psi (175 kg/cm²) and a three day transition period was required until the product sulfur level lined out at 0.185 percent. After seven days operation at 2,500 psi (175 kg/cm²), the hydrogen pressure was increased to 2,850 psi (200 kg/cm²) and a four day transition period was required until the product sulfur level lined out at 0.125 percent sulfur.

The above tests show that while the promoted catalyst requires only a one day transition period for the catalyst to stabilize at a new equilibrium activity level upon an increase in process hydrogen pressure, the non-promoted catalyst required seven, three and four day transition periods to stabilize at a new activity level following increases in hydrogen pressure. Therefore, the Group IV-B promoter metal apparently not only inhibits coke formation on the catalyst in the first place, but also catalyzes the removal of coke already deposited on the catalyst following an elevation in process hydrogen pressure. This characteristic permits rapid and convenient in situ regeneration of the promoted catalyst in the second stage with a reduced period of disruption of desired process conditions.

Table 3 gives the inspections of the product made at the three second section pressure levels during the promoted catalyst aging tests of FIG. 5.

times more oil in a 6 month cycle, and is able to process 3.1 times more oil in a 12 month cycle, as compared to a non-promoted catalyst in the same severity operation.

Since time is proportional to onstream catalyst volume (space time = 1/LHSV), in the case of the pro-

TABLE 3

SECOND STAGE DESULFURIZATION WITH PROMOTED AND NON-PROMOTED CATALYSTS

| | | | | | |
|---|---|---|---|---|---|
| LHSV | — | 0.5 | 0.88 | 0.88 | 0.88 |
| $H_2$ Pressure (psi) | — | 1,880 | 1,830 | 2,310 | 2,780 |
| | | (132 kg/cm$^2$) | (128 kg/cm$^2$) | (162 kg/cm$^2$) | (195 kg/cm$^2$) |
| Temperature: °F. | — | 768 | 700–750 | 750 | 750 |
| | | (409°C.) | (371–399°C.) | (399°C.) | (399°C.) |
| Catalyst | Feed | Non-Promoted | Promoted | Promoted | Promoted |
| Gravity: °API | 22.3 | 24.7 | 24.1 | 24.6 | 25.0 |
| Sulfur, Wt. % | 1.0 | 0.30 | 0.33 | 0.25 | 0.20 |
| Nitrogen, Wt. % | 0.18 | 0.13 | 0.12 | 0.12 | 0.10 |
| Carbon, Wt. % | 86.79 | 87.14 | 87.27 | 86.06 | 87.36 |
| Hydrogen, Wt. % | 12.21 | 12.40 | 12.46 | 12.56 | 12.55 |
| Nickel, ppm | 6.9 | 1.1 | 2.4 | 1.8 | 1.5 |
| Vanadium, ppm | 12.0 | 0.7 | 3.6 | 2.5 | 1.4 |
| Vacuum Distillation, Vol. % Condensed at °F. | | | | | |
| 5 | 596 | 533 | 543 | 543 | 559 |
| | (313°C.) | (278°C.) | (284°C.) | (284°C.) | (293°C.) |
| 10 | 627 | 574 | 586 | 598 | 607 |
| | (331°C.) | (301°C.) | (308°C.) | (314°C.) | (319°C.) |
| 30 | 758 | 726 | 728 | 730 | 744 |
| | (403°C.) | (386°C.) | (387°C.) | (388°C.) | (396°C.) |
| 50 | 878 | 842 | 850 | 848 | 853 |
| | (470°C.) | (450°C.) | (454°C.) | (453°C.) | (456°C.) |
| 80 | — | — | 1,070 | 1,070 | 1,065 |
| | | | (577°C.) | (577°C.) | (574°C.) |
| Cracked | 1,040 | 1,070 | 1,087 | 1,087 | 1,082 |
| | (560°C.) | (577°C.) | (586°C.) | (586°C.) | (583°C.) |
| Carbon Residue: | | | | | |
| Wt. % Rams. | 4.15 | 3.12 | 3.31 | 3.04 | 2.61 |

The second stage feed inspections and the product inspections from a non-promoted catalyst second section aging run are also presented in Table 3. The high desulfurization activity of the promoted catalyst, coupled with the demonstrated decrease in demetallization activity, shows that the promoted catalyst is a more selective catalyst for sulfur removal than a non-promoted catalyst. Also, the five percent distillation temperatures show that the liquid produced with the promoted catalyst is higher boiling than the liquid produced by the non-promoted catalyst. Therefore, the promoted catalyst achieves desulfurization with less hydrocracking and hydrogen consumption than a non-promoted catalyst. These observations account at least in part for the hydrogen savings possible with the promoted catalyst indicated in Example 8.

EXAMPLE 8

In one example utilizing the Group IV-B metal promoted catalyst in the second stage of a two-stage hydrodesulfurization process to reduce the sulfur content of a 1 weight percent sulfur residual oil effluent from a first hydrodesulfurization stage to a 0.3 weight percent sulfur product in a 6 month cycle second stage operation a liquid hourly space velocity of 1.3 is required, while if the same amount of catalyst is to be preserved to last for a cycle of twelve months under otherwise unchanged process conditions, the required liquid hourly space velocity is reduced to 1.09. By contrast, in the same process if the catalyst is not promoted with a Group IV-B metal, the maximum liquid hourly space velocity that can be employed is only 0.5 for a 6 month cycle and this has to be decreased to 0.35 for a 12 month cycle. Therefore, in a second stage a given amount of the promoted catalyst is able to process 2.6 times more oil in a 6 month cycle, and is able to process 3.1 times more oil in a 12 month cycle, as compared to a non-promoted catalyst in the same severity operation.

Since time is proportional to onstream catalyst volume (space time = 1/LHSV), in the case of the promoted catalyst the space time based on the above results for the promoted catalyst in a six month cycle is 0.769 hours (1/1.3) and in a twelve month cycle is 0.917 hours (1/1.09). Therefore, for the promoted catalyst the incremental onstream time required to increase a second stage cycle from 6 to 12 months is only 0.148 hours. On the other hand, in the case of a non-promoted catalyst under the same second stage process conditions, the liquid hourly space time is 2 hours (1/0.5) for a 6 month cycle and is 2.857 hours (1/0.35) for a 12 month cycle, so that the incremental space time is 0.857 hours for the additional cycle length.

It is apparent that a substantially smaller increase in catalyst volume is required to increase the second stage cycle life from six to twelve months when employing a promoted catalyst as compared to the use of a non-promoted catalyst. When employing a promoted catalyst in the second stage, only 19.2 percent more catalyst is required to increase the second stage cycle length from six to twelve months, but when employing a non-promoted catalyst 42.8 percent more catalyst is required for the same increase in cycle life. Therefore, (0.857–0.148)/0.857 × 100, or 82.73 percent, less incremental promoted catalyst, compared to non-promoted catalyst, is required in the second stage to increase the second stage cycle life from 6 to 12 months.

The second stage hydrogen consumption for a 6 month cycle when employing the promoted catalyst is 200 SCF per barrel (3.56 SCM/100L) and is increased to only 215 SCF per barrel (3.87 SCM/100L) for a 12 month cycle so that the hydrogen penalty for the presence of the additional catalyst when increasing the cycle length in the case of the promoted catalyst is only 15 SCF per barrel (0.27 SCM/100L). On the other hand, when employing the non-promoted catalyst, the hydrogen consumption for a six month cycle is 300 SCF per barrel (5.34 SCM/100L), and is elevated to 350 SCF per barrel (6.30 SCM/100L) for a twelve month cycle, so that the hydrogen penalty for the presence of the additional catalyst when increasing the cycle length from 6 to 12 months is 50 SCF per barrel (0.89 SCM/100L). This hydrogen consumption data is based on both the promoted and non-promoted catalysts being employed in the same end-of-run temperature.

Therefore, compared to the use of a non-promoted catalyst, there is a savings of 100 SCF per barrel (1.78 SCM/100L) when employing the promoted catalyst in the second stage for a 6 month cycle, and this savings increases to 135 SCF per barrel (2.43 SCM/100L) when employing the promoted catalyst for a 12 month cycle. Since the hydrogen penalty incurred with any catalyst for an increased cycle length is caused by the occurrence of undesired side reactions due to the presence of the additional catalyst, it is apparent that the extremely low hydrogen penalty incurred with an increased cycle length when employing the promoted catalyst reflects the high selectivity of the promoted catalyst towards desulfurization rather than side reactions. A reduction in side reactions not only saves hydrogen but also leaves the promoted catalyst in a cleaner and more active condition, providing a considerable longer cycle life as compared to use of a non-promoted catalyst in the second stage.

The demonstrated very small hydrogen penalty with increasing second stage cycle life permits the promoted catalyst to be employed for multiple cycles in a second stage without catalyst changes even though the corresonding first stage required catalyst changes at the end of each cycle due to metals deactivation.

Figure 6:
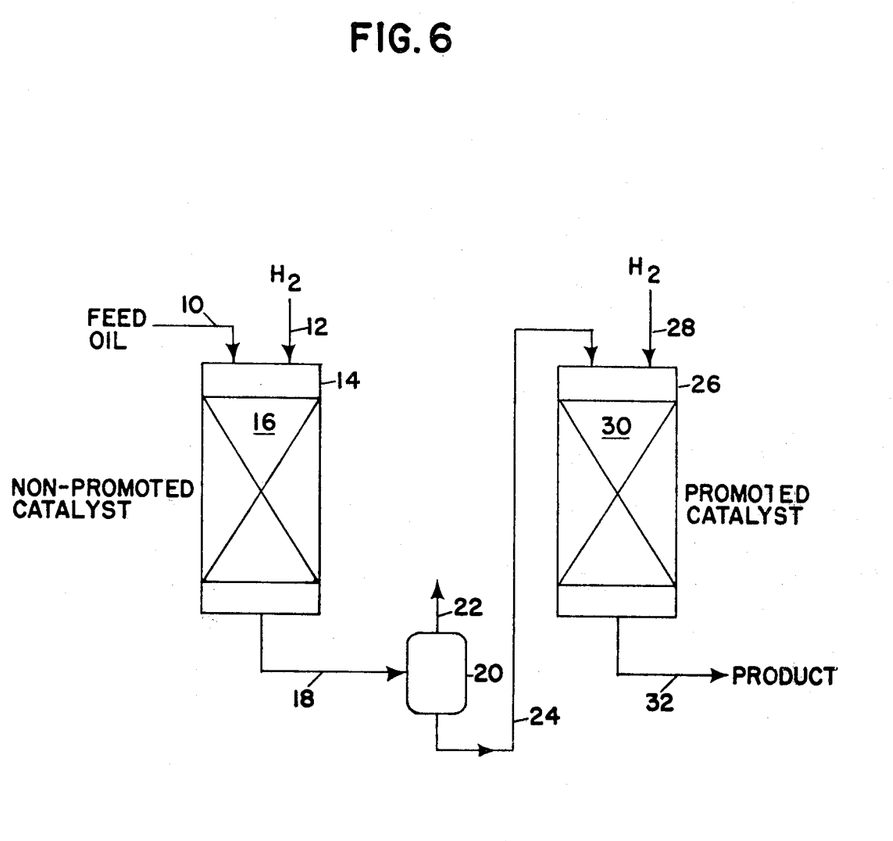

FIG. 6 shows a process scheme which embodies means for taking advantage of the remarkably low penalty in hydrogen consumption when employing a sufficient quantity of promoted catalyst in a second stage to last without changing for a plurality of first stage non-promoted catalyst cycles. Except for a hydrogen consumption penalty due to the presence of excess catalyst, when a second stage contains sufficient promoted catalyst to last for two or more cycles, each of which requires a first stage catalyst change, an economic savings is made in not only total catalyst required in the second stage but also by avoiding a change in second stage catalyst at each occasion for changing the first stage catalyst. Because the hydrogen cost penalty for employing sufficient promoted catalyst in the second stage to last for two first stage cycles is so low, it is possible to realize a net economic advantage from the savings in total catalyst cost and the savings in the cost of one second stage catalyst refill operation by filling the second stage with sufficient catalyst so that it will require emptying and refilling only every second time that the first stage non-promoted catalyst stage is emptied and refilled. Similarly, because the hydrogen cost penalty for employing sufficient promoted catalyst in the second stage to last for three first stage cycles is so low, it is possible to realize a net economic advantage from the savings in total catalyst cost and savings in the cost of two catalyst refill operations by filling the second stage with sufficient catalyst to last for three first stage cycles, etc.

As shown in FIG. 6, feed oil is charged through line 10 and recycle hydroen is charged through line 12 to the top of first stage reactor 14 containing a stationary bed 16 of non-promoted catalyst. First stage effluent in line 18 is passed to flash chamber 20 from which gases are removed through line 22 and from which liquid is removed through line 24 for passage to second stage reactor 26. Make-up and recycle hydrogen is charged to reactor 26 through line 28. Second stage reactor 26 contains a stationary bed 30 of promoted catalyst. The quantity of promoted catalyst in bed 30 can be sufficient to accommodate two or more cycles of non-promoted catalyst in bed 16 without changing. Product is removed from the second stage through line 32.

We claim:

1. A process for the desulfurization of an asphaltene-containing feed oil containing sulfur and metals at a hydrogen pressure between 1,000 and 5,000 psig and a temperature between 600° and 900°F., comprising passing said oil together with hydrogen downwardly through first catalytic and second catalytic hydrodesulfurization stages in series, the catalyst in said second stage comprising Group VI and Group VIII metals together with a promoting amount of Group IV-B metal impregnated on a non-cracking support, said promoting amount being between 1 to 10 weight percent based on the total weight of said catalyst, the catalyst in said first stage comprising Group VI and Group VIII metals on a non-cracking support without said promoting amount of Group IV-B metal, said process including a flashing step between said first and second stages for removing contaminating gases from the oil stream flowing from said first to said second stage, replacing deactivated non-promoted first stage catalyst with fresh non-promoted first stage catalyst at least once without replacing said promoted second stage catalyst so that said promoted second stage catalyst remains onstream for a period equal to at least two first stage catalyst cycles, and removing desulfurized oil from said second stage.

2. The process of claim 1 wherein said promoting amount of Group IV-B metal comprises 2.5 to 8 weight percent of the second stage catalyst.

3. The process of claim 1 wherein said Group IV-B metal is titanium.

4. The process of claim 1 wherein at least 1.9 barrels of oil per pound of catalyst is passed through said second stage catalyst.

5. The process of claim 1 wherein at least 2.85 barrels of oil per pound of catalyst is passed through said second stage catalyst.

* * * * *